Aug. 29, 1972    H. F. DAGUE    3,687,769
LAMINATED PICTURE-TYPE PHONOGRAPH RECORD, AND
METHOD OF MAKING THE SAME

Filed May 18, 1970    2 Sheets-Sheet 1

INVENTOR.
HAROLD F. DAGUE

BY Jaminity & Carr
ATTORNEYS.

Aug. 29, 1972     H. F. DAGUE     3,687,769
LAMINATED PICTURE-TYPE PHONOGRAPH RECORD, AND
METHOD OF MAKING THE SAME
Filed May 18, 1970     2 Sheets-Sheet 2
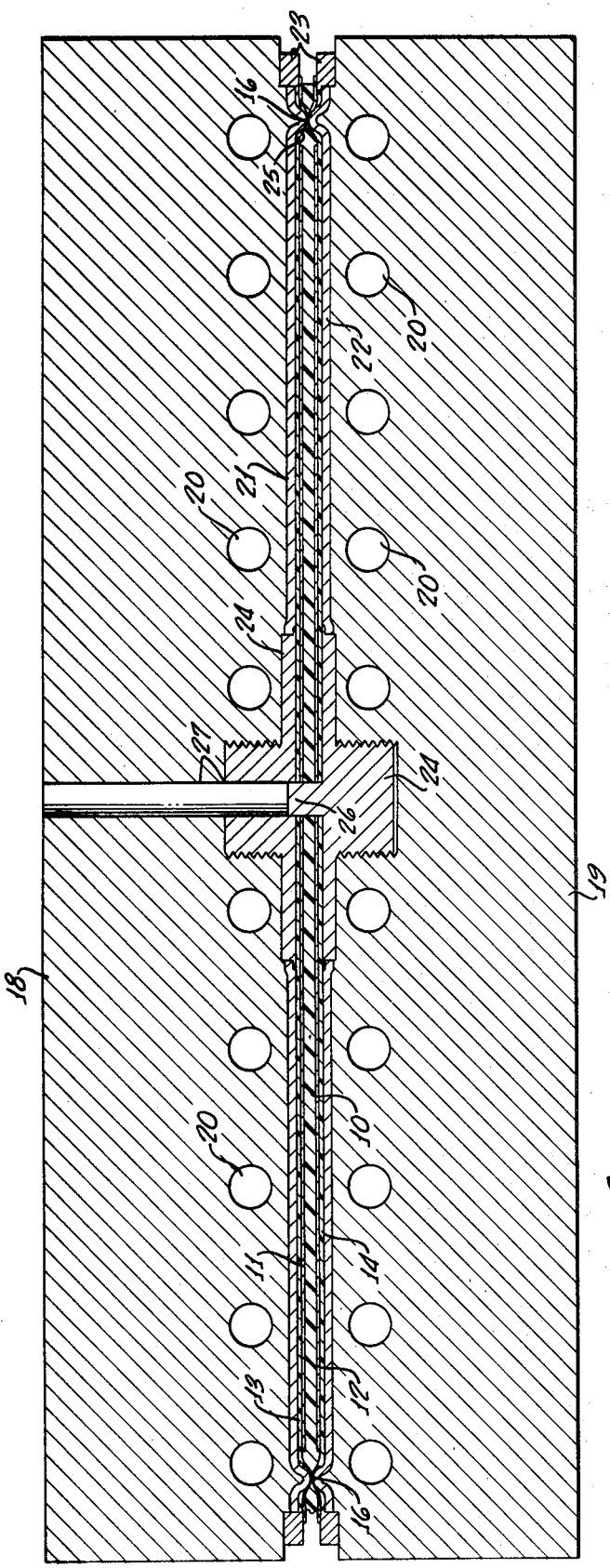
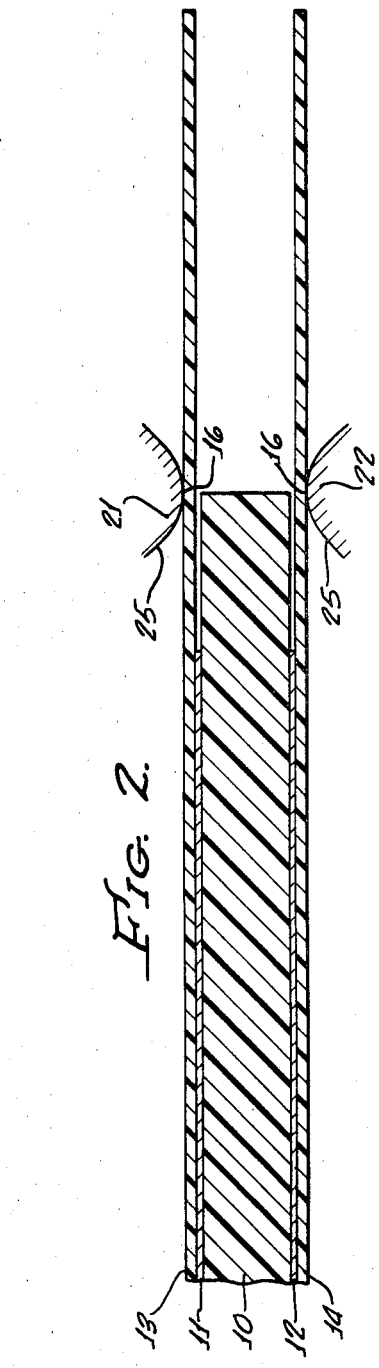
INVENTOR.
HAROLD F. DAGUE
ATTORNEYS.

United States Patent Office 3,687,769
Patented Aug. 29, 1972

3,687,769
LAMINATED PICTURE-TYPE PHONOGRAPH
RECORD, AND METHOD OF MAKING THE
SAME
Harold F. Dague, 1425 Deauville Place,
Costa Mesa, Calif. 92626
Filed May 18, 1970, Ser. No. 38,232
Int. Cl. B29d 17/00
U.S. Cl. 156—219 13 Claims

ABSTRACT OF THE DISCLOSURE

Method of making a laminated picture-type phonograph record of a pre-formed or pre-calendered core sheet of thermoplastic synthetic resin which is colored black or another desired color. Disposed on each side of such pre-formed core sheet is a sheet of paper which is decoratively printed on the side remote from the core sheet. Two pre-formed or pre-calendered surface sheets of thin, highly transparent thermoplastic synthetic resin are mounted on the outer surfaces of the printed sheets of paper, and have the phonograph sound grooves impressed therein. The core sheet and surface sheets extend radially outwardly from the printed paper sheets, and are sealed together at the periphery of the record. In accordance with the method, the core sheet has an outer diameter (prior to pressing) approximately equal to (or greater than) the diameter of the circle of contact of the record press, the sheets of paper have outer diameters less than the diameter of the circle of contact, and the surface sheets have outer diameters greater than that of the circle of contact. The stack of sheets is pre-heated and then placed in the press. The press is heated, closed to impress the sound grooves in the surface sheets and to achieve lamination, and then cooled and opened. There is a critical relationship between sheet thickness and the depth of the mold cavity in the record press.

BACKGROUND OF THE INVENTION

Field of the invention

This invention relates to the field of decorative phonograph records wherein pictures, printing, etc., are located beneath the record grooves instead of merely in the ungrooved center portion of the record.

Description of prior art

A prior-art picture phonograph record is described and claimed in co-pending patent application Ser. No. 789,788, filed Jan. 8, 1969, now U.S. Pat. No. 3,584,094, for Method of Making Picture-Type Phonograph Records, inventors Joe Rock and Harold F. Dague. The record described in such patent application has a central core of cardboard printed on both faces and enclosed by relatively thick sheets of transparent thermoplastic synthetic resin. Such record is a distinct improvement over the prior art, but is not nearly so economical to mass produce, nor so attractive, as is the record described hereinafter.

As indicated in such co-pending patent application, there have been many attempts in the past to produce satisfactory picture-type phonograph records. For example, there is described in Pat. No. 3,102,730 a method of forming a picture-type record wherein a lump (biscuit) of core-forming material is mounted over an insert intended to protect the paper during the drastic radial extrusion of the core lump. Another prior-art patent, No. 3,050,433, applies surface material in powder form instead of as a pre-formed transparent sheet of plastic.

There have been numerous prior-art patents relating to phonograph records which do not incorporate pictures, but which are laminates. These include, for example, No. 862,407, No. 1,230,816 and No. 1,946,596.

Despite the above, there have not been achieved low-cost and mass producible records characterized by high-fidelity sound tracks, extremely thin and transparent surfaces with resulting brilliance of the underlying pictures, lack of rupture of the underlying pictures, black (or other desired color) edges with consequent "framing" effect relative to the pictures, low weight, high strength, and perfect edge seals which prevent ingress of moisture into the vicinity of the paper.

SUMMARY OF THE INVENTION

The laminated picture-type record is made of a pre-formed or pre-calendered core sheet of thermoplastic synthetic resin, and which is relatively thick in comparison to the layers outwardly thereof. Disposed adjacent the core sheet are paper sheets which are printed, on the sides remote from the core sheet, with pictures and/or writing. Surface sheets of highly-transparent thermoplastic synthetic resin are laminated outwardly of the paper sheets and impressed with the sound track of the record. The surface sheets and the core sheet extend radially outwardly from the paper sheets and are sealed together. The surface sheets are formed of resin which does not flow readily but instead merely receives the imprint of the record-pressing stampers. Such surface sheets are to be contrasted with the core sheet which is formed of relatively low grade thermoplastic resin adapted to flow readily and having a relatively low softening or melting point in comparison to that of the surface sheets.

In accordance with the method, the pre-calendered or pre-formed core sheet is disposed in the record press, and has a diameter on the order of the diameter of the circle of contact of the stamper portions of the press. The paper sheets and surface sheets are simultaneously placed in the press, each being pre-calendered or pre-formed, the diameters of the paper sheets being less than that of such circle of contact whereas the diameters of the surface sheets are preferably substantially greater than that of the circle of contact. The press is then closed and heat and pressure are applied to impress the sound track into the surface sheets and to achieve lamination of the stacked layers as well as sealing of the edges thereof. During application of heat and pressure, the core sheet flows outwardly a predetermined amount but the surface sheets do not flow substantially. The platens of the press are then cooled to cool the record, and the press is opened, following which the finished record is removed and trimmed. The stacked layers adapted to form the record should be pre-heated prior to mounting in the press.

A critical relationship exists between the combined thickness of the layers prior to pressing and the combined thickness after pressing, in comparison to the depth of the mold cavity formed when the press is closed. In addition, critical relationships exist relative to the thicknesses of the various layers.

BRIEF DESCRIPTION OF THE DRAWINGS

FIG. 2 is a vertical sectional view of the stack of layers after mounting in the press but prior to closing of the press, only the right portion of the stack (and associated press portions) being illustrated; and FIG. 3 is a vertical sectional view showing the platens, stampers and stack layers after closing of the press with consequent predetermined radial flow of the core layer.

DESCRIPTION OF THE PREFERRED EMBODIMENT

Figure 1:
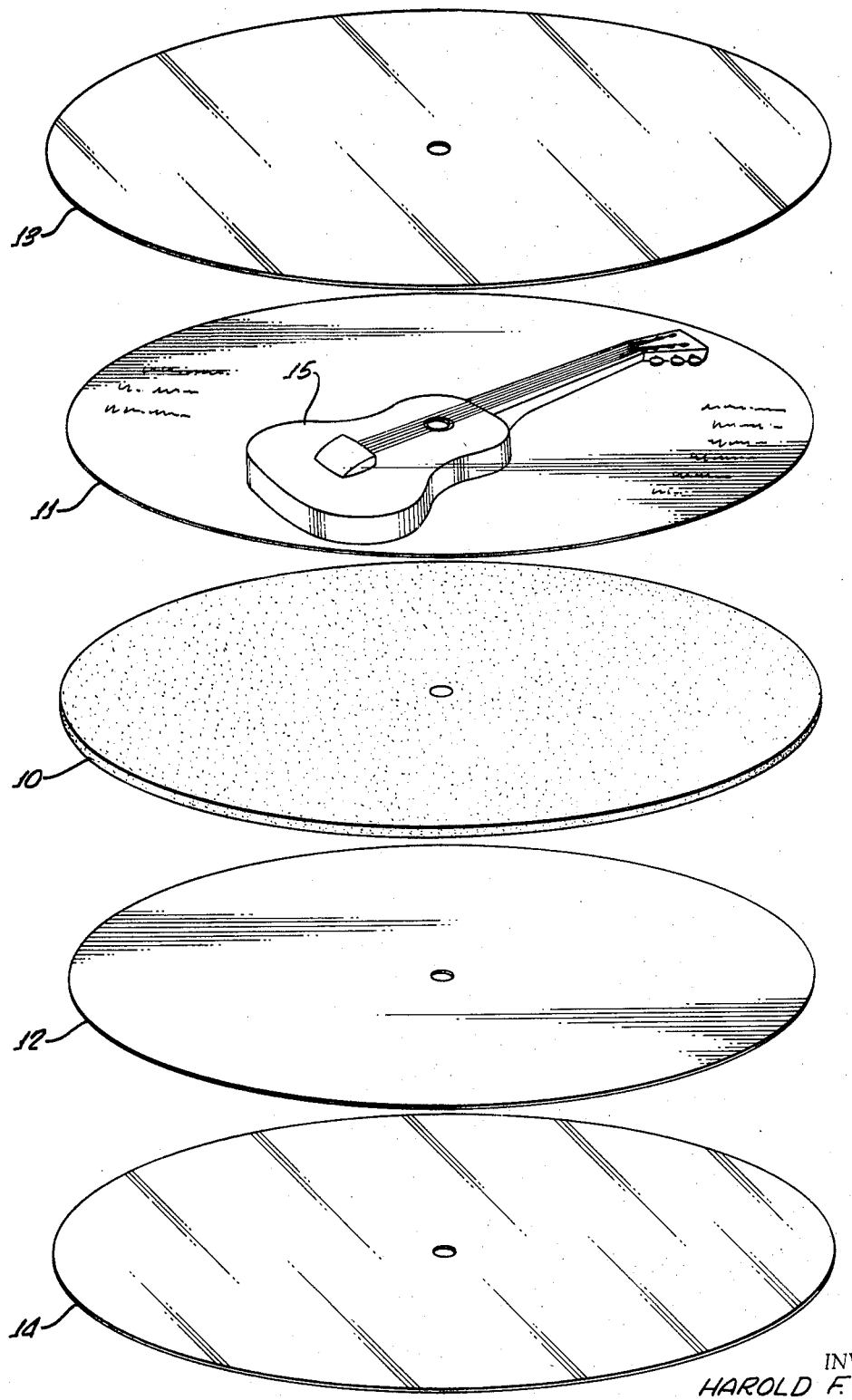
FIG. 1 is an exploded perspective view of the various pre-formed or pre-calendered layers which make up the laminated picture record of the invention.

It is important to the invention that the central or core sheet, and the other sheets, be pre-calendered or pre-formed in a predetermined manner, and prior to mounting in the press. Thus, the core sheet and the other sheets forming the laminate are all formed or cut from previously-formed stock. This is to be distinguished from the placing in the press of a wad or mass of un-formed thermo-plastic synthetic resin, for example as is taught by the above-cited Patent 3,102,730 relative to lump or biscuit 19. This is also to be distinguished from the formation of the surface layers by applying plastic in powder form, for example as is taught by the above-cited Patent 3,050,433. Thus, throughout the present specification and claims, such expressions as "pre-formed," "pre-calendered," etc., denote the use of laminate layers which are previously manufactured in toto, and in a predetermined manner, as distinguished from being formed in the record press. This is not to imply, however, that the grooves are not impressed in the record press since it is an important feature of the invention that the grooves are not formed on the surface sheets prior to mounting in the press but instead are formed during the record pressing operation. This is also not to imply that there is no radial flow of the pre-formed or pre-calendered core sheet during pressing, since a predetermined amount of such radial flow does occur as described hereinafter.

There are presently used, in the record industry, sheets of resin called "preforms." These are generally rectangular in shape. Such sheets are not satisfactory in the present record or method, since the present record and method require substantially circular core sheets (or core sheets all diameters of which are greater than, or almost as great as, the diameter of the circle of contact of the stampers). All diameters of the circular core sheets 10 are, in accordance with the present invention, at least substantially as large as, or not much smaller than, the diameter of the circle of contact.

Referring first to FIG. 1, the laminated picture-type phonograph record is made up of five previously-formed or previously-calendered layers or sheets 10-14, inclusive. Layer or sheet 10 is the core, layers or sheets 11 and 12 are the printed paper sheets, and layers or sheets 13 and 14 are the surface sheets. Each sheet has a center hole adapted to receive the spindle of the record player.

Core layer or sheet 10 is a pre-formed or pre-calendered sheet of thermoplastic synthetic resin adapted to rapidly soften and flow during the pressing operation described hereinafter. The synthetic resin which forms core layer 10 is a low-cost resin, such as filled and extended vinyl. For example, a polyvinyl chloride acetate resin extended with asphaltic or other low-cost materials is satisfactory. The indicated material is a copolymer of the type now being employed for the manufacture of low-cost phonograph records. As a more specific example, the material employed for core disc or sheet 10 may be formed of 100 parts polyvinyl chloride acetate resin, 3 parts stabilizer, 3 parts carbon black, 30 parts coal tar resin, 50 parts earthy filler, and 90 parts crushed scrap from previously-manufactured photograph records (such previously-manufactured phonograph records being composed substantially as described in this sentence).

The core sheet 10 is black. However, it is within the scope of the invention to employ other colored (or even uncolored) material.

Each of the layers or sheets 11 and 12 is a thin, low-cost paper sheet which is printed on its side remote from core layer 10 with suitable printing and/or writing, normally muilt-colored. This may be referred to as "image 15." The sheets 11 and 12 may each be formed of a type of paper well known in the phonograph record industry as "label paper," and is often referred to as "chrome coat." The ink employed in forming the pictures or writing 15 on each of sheets 11 and 12 is a drying type which is characterized by the substantial absence of oils or solvents after manufacture. The presence of oils or solvents in the paper may result in undesirable gassing and formation of blisters, and additionally is undesirable in that it prevents or minimizes bonding of the paper sheets with the surface sheets 13 and 14. The ink and paper should be dry (solvent and moisture free) prior to use in the present record.

Although it is a major advantage of the record and method that thin, low-cost paper is employed, the appended claims are to be construed as covering thicker paper or thin paperboard.

It is emphasized that no additional layers, inserts, etc., need be employed—the laminate instead comprising only the five layers or sheets 10–14.

Each of the surface sheets 13 and 14 is formed of a thermoplastic synthetic resin which is highly transparent and preferably colorless, being relatively thin in comparison to the core sheet 10 and being formed of material which does not soften or flow as readily as does the core sheet. The surface sheets should not incorporate fillers, extenders, etc. More specifically, each surface sheet 13 and 14 is formed of homopolymer polyvinyl chloride film, in contrast to the core sheet 10 which is a copolymer of polyvinyl chloride and acetate as described above. As a more specific example, each surface sheet 13 is "Vynaloy No. 452" polyvinyl chloride, manufactured by B. F. Goodrich. Such substance No. 452 has the following characteristics:

Specific gravity—1.33
Tensile strength (p.s.i.)—7000–7400
Percent elongation at break—200–250
Heat deflection temperature 264 p.s.i. degrees F.—158
Light transmittance percent—90–92

The indicated surface sheets 13 and 14 are adapted to receive the helical sound grooves (incorporating recorded sound) in a very high-quality and high-fidelity manner. The sheets 13 and 14 are much more satisfactory for receiving and holding sound grooves than is the core sheet or layer 10, despite the fact that the core is formed of material conventionally employed for phonograph record manufacture. Furthermore, each surface sheet is glass-clear and thin, so that the picture 15 on the outer surface of each of paper sheets 11 and 12 not only shines readily through the surface sheets 13 and 14 but is actually enhanced by the presence of such sheets. The surface sheets give a glossy appearance to dull-finish pictures, and result in a surprising degree of attractiveness.

As state above, each of the sheets 11–14 is thin in comparison to the core sheet or layer 10, and this produces important results relative to economy, quality, etc. The surface sheets 13 and 14 have a relatively high cost per pound, as is necessary to achieve extremely high-fidelity recordings, great clarity, etc. The paper sheets 11 and 12 are thin since this also reduces costs and facilitates printing, making it unnecessary to do any laminating of paper as described in the co-pending application Ser. No. 789,788 cited above.

Because the sheets 11–14 are all thin, they readily transmit heat and cold from the press platens to the core sheet or layer 10, thereby minimizing the time during which the stack of sheets must be in the record press. This is an important consideration relative to cost factors.

There will next be descrbied the thicknesses of the various sheets or layers 10–14, relative to an approximately "twelve inch" diameter phonograph record which has, after pressing, a combined overall thickness on the order of 0.056 inch to 0.060 inch. It is to be understood that for different thicknesses of the finished records, the layer thicknesses may be modified in accordance with the principles taught in this specification.

For a record of the type (thickness in the range of about 0.056 inch to 0.060 inch) described in the preceding paragraph, the thickness of the core sheet or layer 10 may be in the range of about 0.030 inch to about 0.075 inch. Preferably, for a "twelve inch" record, the thickness of the sheet 10 is approximately 0.060 inch. The recited thickness is the one of the pre-formed or pre-calendered sheet 10 prior to pressing, it being understood that (for reasons stated below) such sheet becomes thinner during pressing. Thus, the thickness of core sheet 10 in the finished (pressed) record is in the range of about 0.010 inch to about 0.059 inch.

Each of paper sheets 11 and 12 has a thickness in the range of about 0.001 inch to about 0.010 inch. Preferably, each paper layer 11 and 12 has a thickness of 0.003 inch. When the thickness of the paper is less than about 0.003 inch, the paper becomes relatively hard to handle in printing as well as in assembling for the present manufacturing process. Also, excessively thin paper permits the color of the core 10 to show through and, in many cases, interfere with the picture 15 present on each of the paper sheets 11 and 12. Paper thicker than 0.003 inch, and thin paperboard, are unnecessarily expensive and bulky, and reduce heat transmission.

Each of the surface sheets 13 and 14 has a thickness in the range of about 0.003 inch to about 0.0075 inch. Preferably, each surface sheet 13 and 14 has a thickness of 0.005 inch. When the thickness is less than 0.005 inch, any roughness in the surfaces of paper sheets 11 and 12 may project through the surface sheets 13 and 14 and cause noise in the record. On the other hand, when the surface-sheet thickness is far greater than 0.005 inch the rate of heat transmission to core sheet or layer 10 is lessened, the expense of each surface sheet is greatly increased, and the clarity of transmission of the picture 15 through the surface sheet is reduced. When relatively thick surface sheets 13 and 14 are used, there must be much higher temperatures of pre-heating, the mold pressure must be gerater, and the time in the press must be longer, than is the case when the thickness of each surface sheet is about 0.005 inch as stated.

The surface sheets 13 and 14 (and paper sheets 11 and 12) have approximately the same thicknesses before and after pressing.

Each of the sheets or layers 10–14 is, as stated above, preformed or pre-calendered. Thus, the core sheet 10 is a disc which is fully manufactured (by calendering, then by cutting into disc shape—preferably while in hot and soft condition) prior to stacking and/or insertion into the record press. Such disc 10 has a predetermined diameter as stated below. Each of the sheets 11 and 12 is a disc having the proper diameter (stated below) and fully manufactured and printed prior to stacking. Also, each of surface sheets 13 and 14 is a disc having the proper diameter specified hereinafter.

Referring to FIGS. 2 and 3, in the latter of which the platens and associated components of a record press are illustrated, there is what may be referred to as a "circle of contact" 16. The circle of contact is where the upper and lower molds or stampers of the press come into closest proximity to each other to partially or completely "pinch off" the plastic layers disposed therebetween. For a "twelve inch" record, the diameter of the circle of contact 16 is 11 and ⅞ inches.

Referring to FIG. 3, the adjacent parallel surfaces of the record stampers or matrices in the closed press are approximately 0.056 inch to 0.060 inch apart, assuming that the exemplary record indicated in the above description relative to layer thicknesses is being manufactured. Thus, the "mold depth" is 0.056 inch to 0.060 inch. Relative to such a record, and relative to the indicated diameter of the circle of contact 16, there will now be given additional information concerning layer thicknesses. The total thickness of the combined layers in the stack of pre-formed or pre-calendered sheets 10–14 (FIG. 1) is, in accordance with the present method, caused to be at least 0.010 inch greater than the depth of the mold (spacing between the adjacent parallel surfaces of the matrices or stampers) when the mold is closed. Such total thickness of the stack of layers should not be more than 0.030 inch greater than such depth of the mold. When the combined thickness of the sheets or layers is less than 0.010 inch greater than the depth of the mold, there is insufficient material to properly fill the sound grooves in the stampers. Conversely, when the thickness of the combined layers or sheets in the stack is more than 0.030 inch greater than the depth of the mold, there is excessive material in the mold with consequent undesired radial flow which tends to pull the paper sheets 11 and 12 into pieces, and also tends to cause the surface sheets 13 and 14 to rupture.

The thicknesses of the various sheets 10–14 given in the preferred example were 0.060 inch for the core sheet 10, 0.003 inch for each paper sheet 11 and 12, and 0.005 inch for each surface sheet 13 and 14. These add to a combined total of 0.076 inch. Such total of 0.076 inch is between 0.016 inch and 0.020 inch greater than the mold depth (0.056 inch to 0.060 inch) specified above. Thus, the combined thickness of the sheets in the example is well within the stated range.

Proceeding to the description of the diameters of the various sheets 10–14, again assuming a "twelve inch" record wherein the diameter of the circle of contact 16 (FIGS. 2 and 3) is 11 and ⅞ inches, the core sheet 10 should have a diameter substantially equal to that of the circle of contact. Thus, in the present example the diameter of the core sheet 10 is approximately 11 and ⅞ inches. The diameter of core sheet 10 is at least as large as a dimension determined by subtracting about ½ inch from the diameter of circle of contact 16. Thus, the outer diameter of core disc 10 for a "twelve inch" record should be at least 11 and ⅜ inches, and is preferably 11 and ⅞ inches. All diameters stated in this paragraph relate to the previously-manufactured sheet 10, prior to pressing.

The diameter of the core sheet 10 may be greater than that of the circle of contact without detracting from the quality of the record, although material will be wasted.

The diameter of each paper sheet 11 and 12 is substantially less than the diameter of the circle of contact 16, being preferably about 11 and ⅝ inches. It is important that the paper have a smaller diameter than the circle of contact, in order that the color of the core sheet 10 will be seen around the picture and provide a frame therefor, and in order that the core sheet 10 may be sealed directly to surface sheets 13 and 14 in order to prevent ingress of moisture to the edges of the paper sheets 11 and 12 with consequent delamination. The diameter of each paper sheet is sufficiently great that a large amount of the image 15 is beneath the sound groove, and not merely at the center of the record. Each paper sheet should have a diameter not more than an inch or two smaller than the diameter of the finished record (this being a matter of aesthetics because the present invention permits any diameter to be used). However, as stated above, the diameter of the paper should not be as great as that of the finished record.

The diameter of each of the surface sheets 13 and 14 is at least as great as, and preferably greater than, that of the circle of contact 16, since the material of each surface sheet 13 and 14 should be one which does not flow radially in substantial amount at the pressures and temperatures employed during pressing. Of course, the diameter of each surface sheet may be much greater than that of the circle of contact, again resulting in wasting of material. Preferably, each surface sheet 13 and 14 has a diameter of about 12 and ½ inches for the "twelve inch" record described in the present application.

For records smaller in diameter than twelve inches, the various sheet thicknesses and diameters may be the same as those recited above, except that the diameters are changed in accordance with record diameter. For relatively small-diameter records, such as seven-inch records, it is customary to provide much less overall thickness than in the case of twelve-inch records. Thus, for seven-inch records, the depth of the mold cavity, and the thickness of core sheet 10, are preferably each decreased by 0.020 inch. The thicknesses of the remaining sheets may remain the same as for twelve-inch records.

Referring to FIG. 3, there is illustrated a book-type record press incorporating upper and lower platens 18 and 19, each having a plurality of passages 20 therethrough in order to receive steam (when it is desired to heat the molds) and cooling water (when it is desired to cool the same). The mold, matrix or stamper elements 21 and 22 are mounted, respectively, on the upper and lower platens 18 and 19 by means of peripheral rings 23 and central inserts 24.

Except at regions adjacent the circle of contact 16, the stampers 21 and 22 and the inserts 24 should be adapted to apply relatively uniform molding pressure throughout the entire diameter of the record. Thus, the inner surfaces of the inserts 24 should be substantially flush with the inner surfaces of the stampers 21 and 22.

Each stamper 21 and 22 has formed therein on the exposed surface thereof the negative of the helical groove (containing recorded sound) of the phonograph record. In records conventionally employed in the United States, the sound grooves in the finished records are about 0.001 inch deep and about 0.002 inch wide.

At regions radially inwardly from the circle of contact 16, the stampers 21 and 22 converge toward each other along generally frustoconical surfaces 25 (FIG. 2) which are shown as being relatively steep. Thus, the resulting record is beveled where it meets the generally frustoconical surfaces 25. The record is cut or trimmed off approximately at the circle of contact 16 after removal from the mold.

The surfaces 25 serve as dams to prevent excessive lateral flow of resin from core 10. The surfaces 25 cooperate with corresponding surfaces, located radially outwardly of the circle of contact, in pinching off the laminate during molding, as above stated.

One of the inserts 24, for example the lower one as shown in FIG. 3, has provided centrally thereon a pin 26 adapted to be inserted into a corresponding bore 27 in the upper insert. The diameter of such pin is conventionally 9/32 of an inch, and corresponds to the central holes in sheets 10-14.

ADDITIONAL DESCRIPTION OF THE METHOD

The stack of sheets or layers illustrated in FIGS. 1 and 2, and having the compositions, thicknesses and diameters described above, is pre-assembled and placed in a pre-heating apparatus. Such pre-heating apparatus may be a conventional air-operated press having platens which are heated to approximately 250 degrees F. The pre-assembled stack may be maintained in such pre-heating press for approximately one minute. Such pre-heating step relative to each stack is preferably effected while the preceding stack is being formed and cooled in the record press.

The pre-heated stack is then disposed in the record press indicated in FIG. 3, with the spindle 26 protruding through the central holes in the layers 10-14 (FIG. 1). While the press is open (as shown in FIG. 2) the temperature of the platens is approximately 225 degrees F., but such temperature rapidly increases to about 250 degrees F. during the pressing cycle. This is because steam, at the proper temperature, is passed through the passages 20 during pressing.

The press is then closed, causing the temperature to increase to 250 degrees F. as indicated, and a pressing pressure of approximately 1800 to 2000 pounds per square inch is applied for a mold time of about fifteen seconds. Cooling water (instead of steam) is then passed through the passages 20 to cool the stampers 21 and 22 to about 125 degrees F., the cooling occurring over a period of about thirty to forty seconds. Thus, the time in the press is about a minute or less.

The pre-heat temperature of 250 degrees F., and the press temperature of 250 degrees F., are well above the softening temperature of the above-described material forming core 10. Such material is therefore soft (like biscuit dough) and flows readily under pressure. On the other hand, the above-described material forming surface sheets 13 and 14 is not sufficiently soft ( at the press temperature of 250 degrees F.) to flow substantially. It is, however, sufficiently soft to receive the impression of the sound groove and associated recorded sound.

The radial-outward flow of core material (from core 10) during pressing is not great, for example being sufficient to increase the diameter of the core 10 from about 11 and 7/8 inches to about 12 and 1/4 inches. Because there is only this small amount of core material flow, and because there is little or no radial flow of surface sheet material, the paper sheets 11 and 12, and the surface sheets 13 and 14, do not tear or rupture.

As described above, the plastic (resin) sheets 10, 13 and 14 have greater diameters than do the paper sheets 11 and 12. Therefore, direct heat seals are effected between the plastic layers at regions radially outwardly of the edges of the paper sheets, that is to say in the vicinities of frustoconical surfaces 25. This results in a very neat, attractive, edge and insures against any ingress of moisture, with consequent delamination, even after the scrap is trimmed from the record at contact circle 16.

After pressing, the record is removed from the press and trimmed at substantially the circle of contact 16, namely at a diameter of 11 and 7/8 inches. Such trimming is a simple operation, because the pinching action during pressing causes the upper and lower stampers to be about 0.005 inch from each other at contact circle 16.

After pressing and trimming, the surface sheets 13 and 14 have the same diameter as the core sheet, which diameter (for example, 11 and 7/8 inches) is larger than that of the paper sheets 11 and 12 (which paper sheet diameter is preferably 11 and 5/8 inches). After pressing, the thicknesses of all sheets, other than core sheet 10, are (as indicated above) substantially the same as before pressing. Thus, in the above-stated preferred example, the thicknesses after pressing are about: 0.005 inch for each surface sheet, 0.003 inch for each paper sheet, and between 0.040 inch and about 0.044 inch for the core.

It is to be understood that a very small amount of the core material lost during pressing is employed for filling the sound grooves in the stampers, not in a direct manner but instead to compensate for (back up) the outward movement of the surface and paper sheets which results from the presence of the grooves.

Reference to "diameters" in this specification and in the appended claims refers to all diameters, not just some. Thus, for example, a recitation that the minimum diameter of core sheet 10 is "$x$ inches" would not be met by a rectangular core sheet the diagonal of which is $x$ inches long. It would, however, be met by a rectangular core sheet having a length at least equal to $x$ inches, and a width at least equal to $x$ inches.

The above description relates to hand operation of a record press in conjunction with a pre-heating press. It is to be understood that by using automation, etc., the press-to be understood that by using automation, etc., the press times may be reduced.

The foregoing detailed description is to be clearly understood as given by way of illustration and example only, the spirit and scope of this invention being limited solely by the appended claims.

I claim:

1. A method of manufacturing a picture-type phonograph record, which comprises:
   providing a record press having a mold cavity defined peripherally by upper and lower annular dam means adapted to come into close proximity with each other at a circle of contact when the press is closed, said record press incorporating helical grooves carrying recorded sound, disposing in said press two previously-manufactured surface sheets of predetermined diameter and thickness, said surface sheets being transparent sheets of thermoplastic synthetic resin and which have diameters at least substantially as large as that of said circle of contact, said synthetic thermoplastic resin forming said surface sheets having a softening temperature sufficiently high that said surface sheets do not flow laterally in substantial amount during pressing, but sufficiently low that said surface sheets will receive the impressions of said helical grooves, said synthetic thermoplastic resin forming said surface sheets being a homopolymer polyvinyl chloride, disposing in said press inwardly of said surface sheets two paper discs which are printed on their sides adjacent said surface sheets, and which have diameters somewhat less than that of said circle of contact, disposing between said paper discs a core of extended polyvinyl chloride acetate copolymer, said core having a softening temperature substantially lower than that of said surface sheets, and closing said press and employing sufficient temperature and pressure to cause radial-outward flow of resin of said core, to cause said surface sheets to have impressed therein said sound grooves carrying recorded sound and to cause said surface sheets to encapsulate the material therebetween.

2. The invention as claimed in claim 1, in which said method further comprises causing each of said surface sheets to have a thickness in the range of about 0.003 inch to about 0.0075 inch.

3. The invention as claimed in claim 2, in which said method further comprises causing the thickness of each of said surface sheets to be about 0.005 inch.

4. The invention as claimed in claim 1, in which said method further comprises causing each of said paper discs to have a thickness in the range of 0.001 inch to about 0.010 inch.

5. The invention as claimed in claim 4, in which said method further comprises causing the thickness of each of said paper discs to be about 0.003 inch.

6. The invention as claimed in claim 1 in which said surface sheets extend radially outwardly from the peripheral edges of said paper discs, and in which said method further comprises effecting heat sealing of said surface sheets and outer edges of said core.

7. The invention as claimed in claim 1 in which said dam means form peripheral frustro conical edges of said mold cavity, and in which said surface sheets are compressed toward each other and inwardly toward the outer peripheral edge of the compressed core as the latter flows radially outwardly toward the dam means, whereby the finished record has an inwardly beveled peripheral edge covered and heat sealed by said surface sheets.

8. The invention as claimed in claim 7 wherein said surface sheets have a diameter greater than the diameter of said mold cavity at mating edges of said dam means, said surface sheets being pressed against each other between said dam means as said press is closed.

9. The method as claimed in claim 8 in which said method comprises causing each of said surface sheets to have a thickness in the range of about 0.003 inch to about 0.0075 inch, and causing each of said paper discs to have a thickness in the range of 0.001 inch to 0.010 inch.

10. The method as claimed in claim 1 wherein said temperature and pressure are insufficient to cause radial-outward flow of said surface sheets.

11. The method as claimed in claim 10 including the step of cooling the contents of said mold cavity before removal from the press.

12. The method as claimed in claim 11 wherein the pressure employed to cause said radial-outward flow of said core is applied for a period of about fifteen seconds.

13. The method as claimed in claim 12 wherein the contents of said mold cavity are cooled to about one hundred twenty-five degrees Fahrenheit after application of said pressure and before removal from the press.

References Cited

UNITED STATES PATENTS

| 2,352,285 | 6/1944 | Proctor | 156—219 |
| 2,678,895 | 5/1954 | Belar et al. | 156—220 X |

FOREIGN PATENTS

| 675,679 | 7/1952 | Great Britain | 264—107 |
| 271,796 | 6/1927 | Great Britain | 264—107 |

BENJAMIN A. BORCHELT, Primary Examiner

G. E. MONTONE, Assistant Examiner

U.S. Cl. X.R.

264—107